Dec. 12, 1933.     G. H. WHITE     1,938,880
ICE CREAM METHOD AND MACHINE
Filed June 11, 1929      2 Sheets-Sheet 1
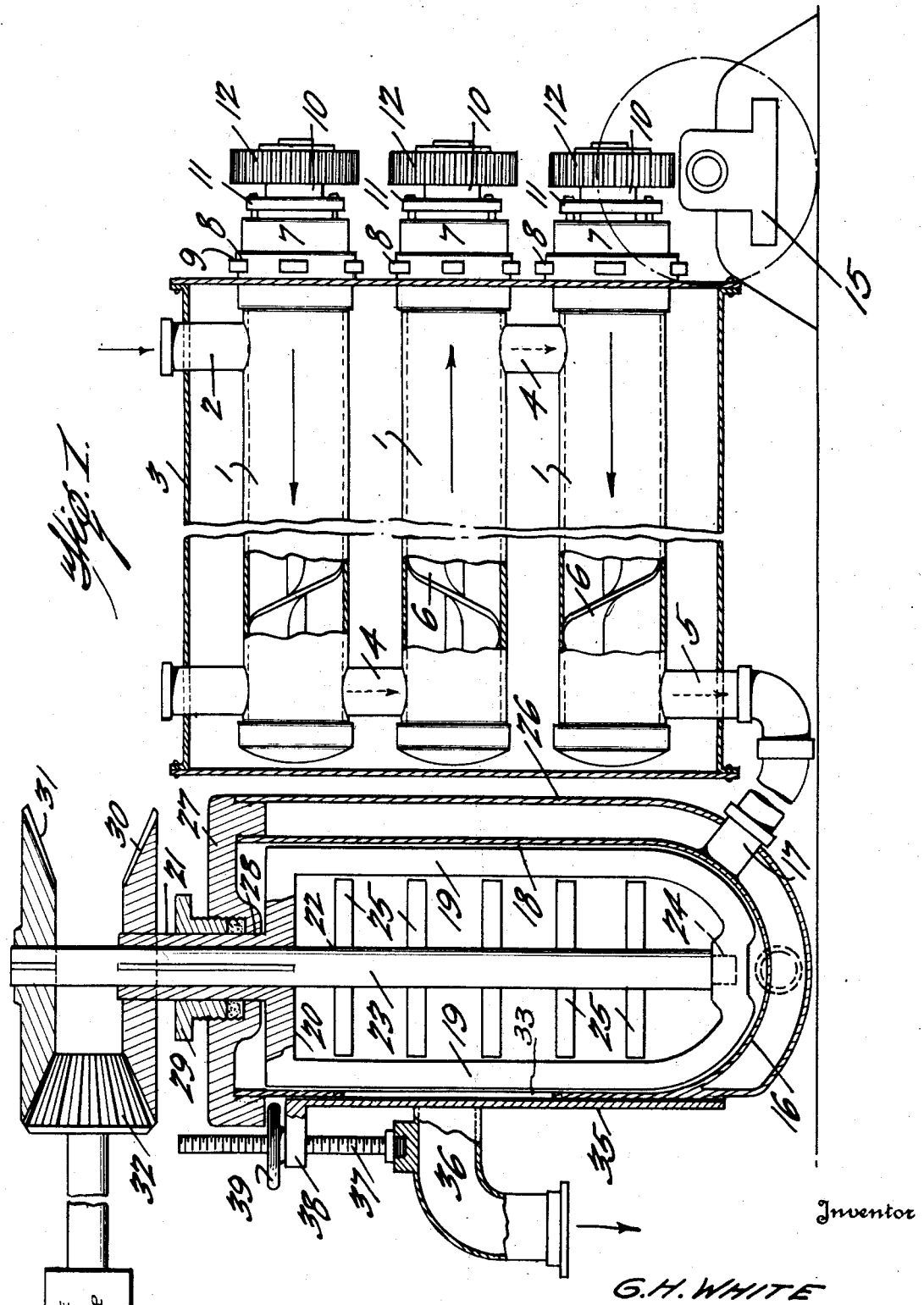
Inventor
G. H. WHITE
By
Attorney Dec. 12, 1933.   G. H. WHITE   1,938,880
ICE CREAM METHOD AND MACHINE
Filed June 11, 1929   2 Sheets-Sheet 2
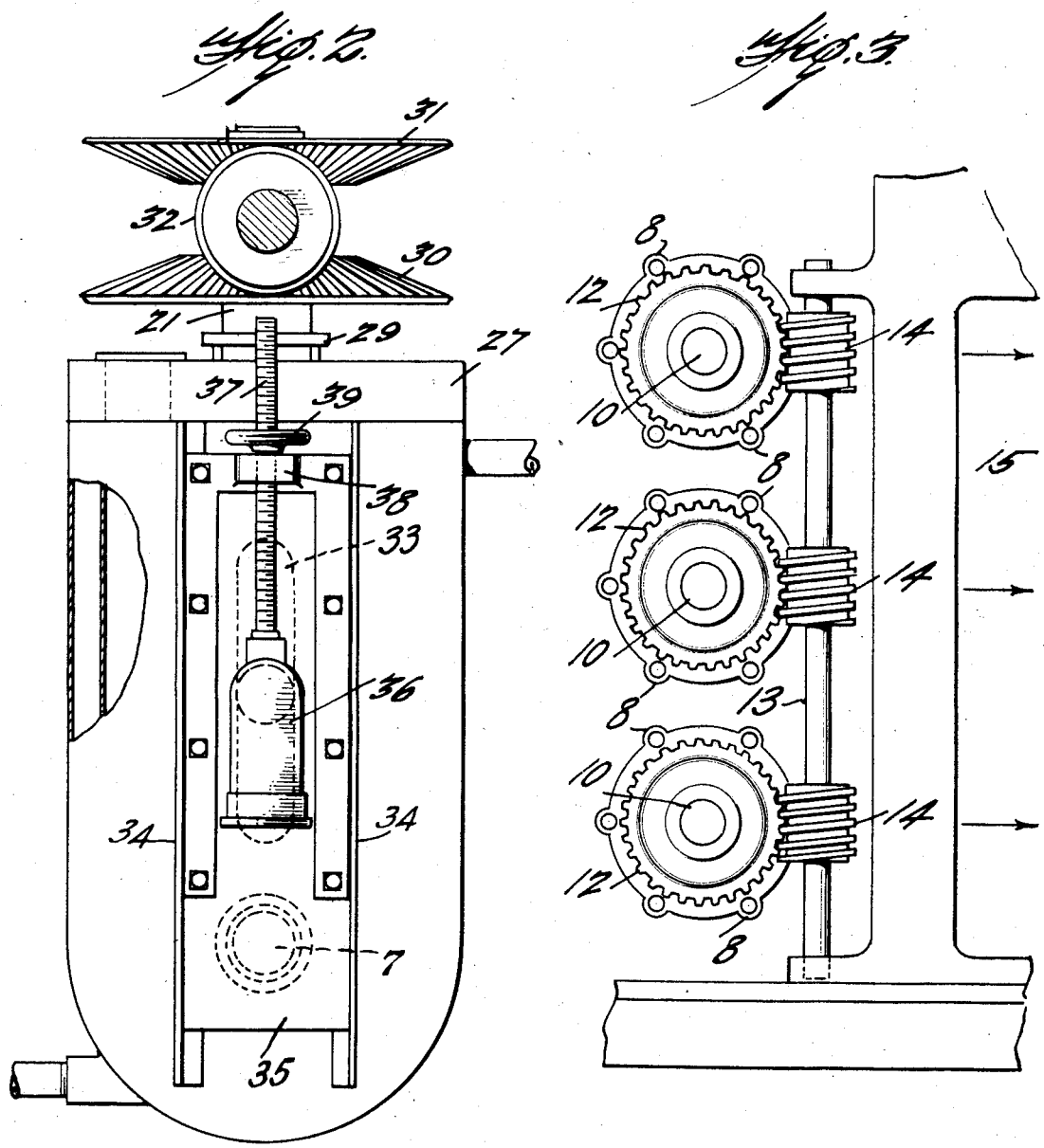
Inventor
G. H. WHITE
By
Attorney Patented Dec. 12, 1933

1,938,880

UNITED STATES PATENT OFFICE 1,938,880

ICE CREAM METHOD AND MACHINE

George Hall White, Washington, D. C.

Application June 11, 1929. Serial No. 370,000

11 Claims. (Cl. 62—174)

This invention is directed to a method of and apparatus for the production of ice cream, wherein the production is a continuous one, and the final product controlled in "yield" as desired.

In the conventional and best known commercial method of manufacturing ice cream, the mix is delivered to independent freezers, in which it is aerated for the desired "yield" and in which it is frozen to the desired consistency, and thereafter placed in cans or containers for final freezing in the cold room. This method requires a continual supervision of and charging of the freezers, a continuous transfer from the freezers to the cans, and necessitates practically uninterrupted skilled supervision, particularly where ice cream is manufactured in commercial quantities.

It has been heretofore proposed to manufacture ice cream in a more or less continuous manner, that is where the mix is continuously delivered to the freezers and continuously delivered therefrom, but these efforts have proven unsuccessful from a commercial standpoint primarily for the reason that the resultant product is without the required "yield"; or there are no means by which the "yield" can be controlled. It is of course well known that under similar aeration a mix of higher acidity provides a higher "yield" than a mix of lower acidity, and any fixed aeration in a continuous process will therefore vary the "yield" in separate mixes. This has proven a serious disadvantage to known process of continuous ice cream production.

The present invention is therefore directed to a method and apparatus in which the aeration period can be manually controlled, with the effect of delivering the frozen product to the cans for final freezing with a predetermined "yield"; the delivery of the product from the aerator with the desired "yield" being automatically incident to the aeration and the character of the product, particularly its acidity.

The method consists in subjecting the mix to the action of several freezers through which the mix is forced to travel in succession while being continuously subjected to the influence of an external refrigerant; then delivering the partly frozen product to an aerator in which the product is thoroughly agitated and beaten up for the inclusion of the air necessary to the "yield" of the product, the agitation being under the influence of an external refrigerant; and providing for the delivery of the product from the aerator under various conditions of "yield" by arranging for such delivery at the particular height in the aerator to which the product will reach under the particular light or aerated condition necessary to produce the required "yield".

The apparatus employed consists in a series of fixed freezers in communication at alternate ends, the freezers being arranged within a closed tank through which a suitable refrigerant is being circulated. Spiral scrapers are operated in each freezer to force the product lengthwise the same and insure that the frozen product naturally adhering to the interior surface of the freezer is continually scraped therefrom. Following the travel of the product through the freezers, it being understood that the mix is continuously delivered to the initial freezer, the product is delivered directly to an aerator in which reversely driven elements beat up the product for the aeration thereof in order that the product may have the desired "yield". The aerator is surrounded by a refrigerant, and is provided with an outlet which is manually adjustable to different heights on the aerator. Thus, under a predetermined aeration, that is a desired "yield" point of the product, the product will reach a certain height in the aerator, and if the outlet has been set at this point, it is apparent that the product will be delivered from the aerator with the particular "yield".

The apparatus of the aerator includes beater elements reversely driven under the influence of a variable speed motor to permit the speed of the elements to be regulated as desired. With such regulation, the aeration or "yield" condition of the product can be determined quite closely, for the product is passing continuously through the apparatus and therefore requires a definite time to reach the outlet and with the speed of the beating up controlled the "yield" condition in the product during the period of time for the passage of the product can be more or less regulated. Additionally, there is provided an adjustable outlet by which the "yield" condition of the product substantially regulated by the speed of the beaters may be additionally and exactly regulated by the adjustment of the outlet.

The invention is illustrated in the accompanying drawings, in which:

Fig. 1 is a view in elevation, partly in section, of the apparatus for carrying out the method of continuous ice cream making.

Fig. 2 is an end elevation of the aerator, showing particularly the adjustable outlet.

Fig. 3 is a view in elevation, showing the driving means for the feeders and scrapers of the freezers.

The improved continuous ice cream apparatus comprises a battery of freezers 1, of which there may be any desired number. There are three such freezers shown in the illustrated embodiment of the invention, the uppermost of which has a mix inlet 2, leading through the refrigerant tank 3, which envelops the freezers, the respective freezers communicating with each other at opposite ends, as at 4. Thus the product moves through the respective freezers in succession, and from the final freezer through an outlet 5, also leading through the refrigerant tank.

A spiral or screw like conveyor 6 is mounted for rotation in each freezer, these conveyors acting to force the material lengthwise the freezer in a direction for delivery to the next freezer, and at the same time scrape the more or less frozen film of material from the interior surface of the particular freezer. The freezers have an open end which extends through the refrigerant tank wall, there being a head secured by bolts for closing such open end of the freezer. The head 7, is removably secured by bolts 8 on a somewhat enlarged extension 9 of the freezer, and is formed with an opening for the passage of the shaft 10 of the particular conveyor, the head also carrying a bearing 11 for the shaft. Beyond the bearing the shaft is provided with a gear 12, and the gears of all conveyor shafts are driven by a suitably driven shaft 13, preferably through worm sections 14 thereon in cooperation with the respective gears. The drive shaft 13 is mounted at its lower end in a sliding bearing 15, permitting bodily movement of the shaft to disconnect the worms and gears, when desired to gain access to the freezers for cleaning or other purposes.

An essential part of the construction is the aerator, shown as a casing 16 open at the top and preferably rounded at the bottom. This casing is in open communication with the freezer battery outlet 5 through a pipe 17, which opens into the aerator casing near the lower end thereof. Mounted for rotation within the aerator casing 16 is a beater and scraper 18, preferably including arms 19 which conform to and fit closely against the interior surface of the casing, and an upper uniting cross bar or bars 20, from which rises a sleeve extension 21. A second beater 22 is mounted for rotation within the beater 18, such beater 22 including a shaft 23 rotatively fitting within and extending above the sleeve 21, the lower end of the shaft being mounted in a bearing 24 formed in the lower portion of the beater 18. The shaft 23 is provided with radiating arms 25, the free terminals of which operate just within the inner plane of operation of the arms of the beater 19. The aerator casing, except in the particulars hereinafter noted, is inclosed in a refrigerant tank, through which refrigerant is circulated, in order that the desired temperature of the product may be maintained during the aeration. The upper end of the casing 16 and of the refrigerant tank 26 is closed by a cap 27, the cap being formed with an opening 28 for the passage of the sleeve 21 therethrough, a conventional packing gland 29 preventing leakage at this point.

The sleeve extension of the beater 18 is provided with a beveled pinion 30, a similar pinion 31 being secured on the end of the shaft 23, above and in spaced relation to the pinion 30. A drive pinion 32 is arranged between and acts to simultaneously and reversely drive the pinions 30 and 31, thereby reversely operating the respective beaters 18 and 22.

The front or other appropriate wall of the casing 16 is formed with an opening 33 extending through the length of the casing, the edges of the opening having guides 34 in which is slidably mounted a gate 35. The gate is designed for vertical movement relative to the casing, and is of course to be so mounted in the guides that any possibility of leakage at these points is prevented. An outlet 36, in the form of an appropriate delivery spout, is carried by the gate 35 and opens therethrough to communicate with the interior of the casing 16. That portion of the casing 16 included or formed by the gate 35 is not within the refrigerant tank 26, the latter terminating short of the guides 34.

A threaded rod 37 extends upwardly from the outlet 36, and through a guide 38 projecting from the casing. A hand wheel 39 is threaded on the rod above the guide, thus permitting any desired raising or lowering of the gate and the outlet carried thereby. Of course it is understood that the gate 35 effectively closes the opening 33 in the casing even at the extreme upper limit of movement of the gate, and that the relation of the gate and opening is such that the lowest limit of gate movement permitted maintains effective closing of the opening 33 in the casing.

The apparatus is continuously fed with the mix through the freezer inlet 2, and the material continuously subjected to the influence of the refrigerant in the tank 3, is forced by the conveyors 6 through the respective freezers in succession. The material when delivered from the final freezer is in the proper frozen condition, but is absolutely without "yield" owing to the entire absence of beating or air dissemination during the freezing. The product is delivered to the aerator, where, under the action of the beaters the product is beaten up and the contained air widely disseminated until the product has reached the point of desired "yield". It is well understood in the trade that products of different "yields" are necessary for different requirements; as for example, commercial ice cream requires a "yield" of about ninety per cent, while caterer's ice cream (so called) requires a much less "yield". Again it is known to the trade that ice cream in which the acidity of the mix is high will reach a desired "yield" condition in much less time and under less beating up and aeration, than where the mix is of less acidity.

Therefore, with the acidity of the mix known, and the desired "yield" of the final product also known, it is only necessary to set the outlet 36 of the aerator at that height reached by the beat-up product at the desired "yield" condition, and the product is automatically discharged in the desired condition as to "yield". Of course it is understood that the product in the aerator as it is beaten up under the action of the beaters and becomes lighter, will rise in the casing 16 until the outlet 36 is reached, so that with the "yield" point of the product height in the casing known, and the outlet set at this point, the final product will flow from the aerator without further beating action, that is without further aeration tending to increased "yield".

Therefore, with the possibility of providing not only for a "yield" of the product, but of controlling that "yield" condition in accordance with the known acidity of the mix and of the required "yield" of the product, it is apparent that the improved method and apparatus can continuously produce ice cream from any character of mix and of any required output. This result is gained primarily through adjustment of the height of the outlet, though it will be understood that a somewhat similar result can be secured through the relations of the pinions 30 and 31 and the pinion 32, as with increase or decrease of the beating up the "yield" of the mix can be to some extent controlled.

The ice cream from the aerator is delivered to the usual cans for final freezing in the cold room, and it is in this final freezing that the product is completed, as is well understood commercially.

It will be remembered that the present apparatus is a continuous ice cream machine, that is the material is flowing continuously through the aerator under the feeding pressure in the freezers, and that a known period of time is required for the material to rise from the inlet of the aerator to the outlet. The pinion 32 is operated by a variable speed motor and thus the speed of the pinions 30 and 31 and thereby of the beaters 18 and 22 may be controlled. With the time known which is required for the travel of the product through the aerator, the "yield" condition imparted to that product during this time of travel may be more or less nicely regulated by the control of the speed of the beaters. The adjustability of the gate 35 to thereby arrange the outlet 36 from the aerator at any desired point furnishes a final and practically exact control of the "yield" condition, for with this adjustment delivery of the product may be had at the exact point at which the beaters operating at the predetermined speed will produce the desired "yield" condition.

What is claimed to be new is:

1. A method of continuously manufacturing ice cream from the mix, consisting in continuously and progressively subjecting the mix to the action of a refrigerant, thereafter treating the refrigerated product to increase the "yield" thereof, and interrupting such "yield" treatment when the product has reached any selected predetermined "yield" condition.

2. A continuous ice cream apparatus, including a battery of freezers, means for forcing the mix through the freezers in succession, a beater to which the refrigerated product from the freezers is delivered for increasing the "yield" of the product, and adjustable means carried by the beater for limiting the "yield" to which the product is subjected in the beater.

3. An apparatus for continuously manufacturing ice cream from the mix, including a plurality of freezers in series communication, followers in each freezer for forcing the product lengthwise that freezer, means for delivering the mix to the initial freezer, a beater to which the product is delivered from the final freezer, an outlet from the beater, and means for adjusting the height of the outlet to thereby control the "yield" condition of the product delivered from the beater.

4. A machine for the continuous manufacture of ice cream from the mix, including a plurality of freezers in series communication, a follower in each freezer for forcing the product lengthwise that freezer, means for admitting the mix to the initial freezer, an apparatus for receiving the product from the final freezer, means in said apparatus for treating the product to increase the "yield" thereof, and an adjustable outlet from the apparatus to vary the point of delivery of the treated product from the apparatus in accordance with a pre-selected "yield" condition of said product.

5. An apparatus for continuously manufacturing ice cream from the mix, including a plurality of freezers in series communication, a follower in each freezer, means for admitting the mix to the initial freezer, means for subjecting all of the freezers to the action of a refrigerant, a treating device to which the product is delivered from the final freezer, means in said device for treating the product to increase the "yield" thereof, an outlet from the device for the treated product, and means for adjusting the outlet to thereby determine the "yield" condition of the delivered product.

6. An apparatus for continuously manufacturing ice cream from the mix, including a plurality of freezers in series communication, a follower in each freezer, means for simultaneously operating the followers, means for subjecting the freezers to the influence of a refrigerant, means for delivering the mix to the initial freezer, a beater to which the product is delivered from the final freezer, beating elements operating in the beater to increase the "yield" of the product, a gate mounted for vertical adjustment on the beater, and an outlet for the product carried by the gate whereby through the vertical adjustment of the outlet, the delivery of the product from the beater is insured at a predetermined "yield" condition of said product.

7. In an apparatus for the continuous manufacture of ice cream, a casing into which the mix is delivered at the lower end, oppositely acting beaters mounted within the casing, a variable speed mechanism for actuating the beaters, an outlet from the casing, and means for adjusting the outlet longitudinally of the casing.

8. In an apparatus for the continuous manufacture of ice cream, an aerator casing into which the frozen mix is delivered at the lower end and forced vertically of the casing, means for imparting the desired "yield" to the mix within the casing, said means being regulatable to insure the desired "yield" treatment in proportion to the travel of the mix under the feeding pressure to thereby determine the "yield" of the mix at a certain height in the casing, a movable outlet for the casing and adjustable means whereby the outlet from the casing may be accurately arranged with respect and in proportion to the "yield" treatment and the feeding pressure of the mix, whereby the inherent qualities of the mix tending to influence the "yield" conditions under treatment may be accurately compensated for.

9. A method of continuously manufacturing ice cream from the mix, consisting in continuously and progressively subjecting the mix solely to the action of a refrigerant without aeration, and thereafter treating the refrigerated product to produce a pre-selected, uniform "yield" condition, the "yield" treatment being predicated upon the inherent qualities of the mix.

10. A method of continuously manufacturing ice cream from the mix, consisting in continuously and progressively subjecting the mix solely to the action of refrigerant, and thereafter aerating the refrigerated product to a predetermined "yield" condition, the product being under the influence of a refrigerant during aeration.

11. A method for the continuous manufacture of ice cream from the mix, consisting in continuously subjecting the mix under a feeding pressure solely to the action of a refrigerant for freezing without aeration, and thereafter and under the same feeding pressure subjecting the refrigerated mix to an aerating treatment to increase the "yield" thereof.

GEORGE HALL WHITE. [L. S.]